United States Patent [19]

Woo et al.

[11] 4,357,560

[45] Nov. 2, 1982

[54] WEB TRANSPORT CONTROL CIRCUIT

[75] Inventors: Way D. Woo, Lincoln; William Steddom, Peabody, both of Mass.

[73] Assignee: Dennison Manufacturing Company, Framingham, Mass.

[21] Appl. No.: 164,483

[22] Filed: Jun. 30, 1980

[51] Int. Cl.³ .................................................. B65H 77/00
[52] U.S. Cl. ............................................... 318/7; 318/6
[58] Field of Search ........................................ 318/7, 6

[56] References Cited

U.S. PATENT DOCUMENTS

| | | | |
|---|---|---|---|
| 3,501,682 | 3/1970 | Jacoby | 318/7 |
| 3,704,401 | 11/1972 | Miller | 318/7 |
| 4,012,674 | 3/1977 | Spitsbergen et al. | 318/7 |
| 4,063,139 | 12/1977 | Miller | 318/7 |

*Primary Examiner*—B. Dobeck
*Attorney, Agent, or Firm*—Arthur B. Moore; George E. Kersey

[57] ABSTRACT

Method and apparatus is disclosed for driving the take up and supply spools of a web transport system. The apparatus includes a pair of direct current motors, one for each spool, and a circuit for regulating the current in the two motors. The circuit senses the counter EMF across the takeup motor, and accordingly controls the current in the supply motor, in order to apply a proper dragging torque to the supply spool. In the event of a loss of power to the web transport, the two spools are brought to a stop in a controlled manner by electronic means.

10 Claims, 5 Drawing Figures

WEB TRANSPORT CONTROL CIRCUIT

BACKGROUND OF THE INVENTION

The present invention relates to a web transport system, and more particularly to a drive system for the takeup and supply spools of a web transport. A wide variety of web transport systems are available for different applications, such as magnetic tape transports, transports for cinematographic film, and the like. These systems generally require careful handling of the web, with more or less rigorous requirements depending on the given applications.

A principal design criterion for the tape transport system of a magnetic tape cleaner, for example, is that the tape travel at a desired speed profile and tension profile. Among the primary components of a typical transport system are two spools for supply and takeup of magnetic tape, which store the magnetic tape and feed the tape to and from the cleaning stations (deck components). The rotation of these spools is regulated by a drive system, usually involving one or more motors and electronics for delivering power to the motors.

It is generally desirable that magnetic tape maintain the desired tension profile during winding and unwinding of the spools. The drive system is advantageously designed so that the tape will not be unduly stressed at one or the other of the spools under operating conditions. In the particular case in which the rotation of each spool is controlled by a separate motor (allowing more independent control), the torque delivered by each motor should be correlated with the winding diameter of the corresponding spool. Thus, to maintain an even tension, the torque delivered by a motor should increase as the winding diameter increases and motor speed decreases, assuming that the tape is transported at a constant speed.

In prior art tape transport systems, AC motors have typically been used to drive the takeup and supply spools. These motors are characterized in that they produce a torque which matches the load to the motor. Torque will thus tend to decrease with motor speed, which will create an undesirable tendency of tape tension to fall as a spool becomes fuller. More recently, direct current motors have been found to have superior characteristics in this regard. Where the stator comprises a permanent magnet (in a "permanent magnet motor"), the torque produced by the motor is reasonably proportional to the current to the motor, providing increased control of tape tension. The design of transport systems incorporating DC motors, however, requires that the controlling electronics be adapted to changes in winding diameter and to the need for smooth startup and braking of spool rotation.

Accordingly, it is one object of the invention to provide a control system for the takeup and supply spools of a web transport. A related object is that such a system allow the transport of tape at a reasonably constant speed, and within specific tension limitations. A further related object is the avoidance of undue stress to the magnetic tape at either spool.

Another object of the invention is the design of a transport system utilizing a pair of direct current motors to drive the takeup and supply spools. A related object is the achievement of a control circuit to provide a current at each motor according to the torque required at the corresponding spool.

A further object is the provision of transport control apparatus which utilizes the electrical characteristic of the drive motors to regulate the performance of the motors. A related object is the incorporation of electronic braking and torque control techniques.

SUMMARY OF THE INVENTION

In accomplishing the above and related objects, the invention provides electronic circuitry for driving the supply and takeup spools of a web transport and for bringing the spools to a controlled stop.

In accordance with one aspect of the invention, the takeup and supply spools are driven by a pair of DC permanent magnet Takeup and Supply motors. In accordance with a related aspect of the invention, the current to the respective motors is regulated in order to transport the tape at a reasonably constant speed and tension, and to avoid the occurrence of slack during the stopping of the two spools.

In accordance with another aspect of the invention, the circuit includes means for selectively directing current supplied by a regulated current source in order to determine the mode of operation. In a preferred embodiment, the modes of operation include Forward and Reverse Drive modes, and Stop and Reset modes. These modes are advantageously determined by means of Forward/Reverse and Run/Stop relays, as well as a number of diodes.

In accordance with a further aspect of the invention, the voltage across the takeup motor is detected by a branch of the circuit in Drive mode, which approximates the counter EMF across the motor. In accordance with a related aspect, this counter EMF controls the current across the supply motor. In a preferred embodiment, the counter EMF determines the biasing of one or more transistors in order to control the supply motor current.

In accordance with yet another aspect of the invention, in Reset mode the current from the current source passes through voltage limiting resistors before reaching both motors. In both Stop and Reset modes, a resistor/diode network feeds the counter EMF of the supply motor back to that motor, causing a braking of the motor, while allowing only a limiting braking feedback to the takeup motor.

BRIEF DESCRIPTION OF THE DRAWINGS

The avove and additional aspects of the invention are illustrated in the detailed description which follows, taken in conjunction with the drawings in which.

DETAILED DESCRIPTION

Reference should now be had to FIGS. 1-4 for a detailed description of the web transport circuit of the invention. This circuit is herein described in conjunction with a magnetic tape transport system, for illustrative purposes. This circuit could be equally validly extended to other applications involving transport of a web, such as a transport for cinematographic film. The circuit of the invention is advantageously employed in the transport of webs at high speeds. The circuit is designed for several modes of operation, as discussed below.

Forward and Reverse Drive Modes

The circuit operation in these modes is designed to provide current flow to the takeup and supply motors which will cause the spools to exert respective torques on the magnetic tape such that the tape will be maintained at a reasonably constant tension throughout the machine operation. Motors M1 and M2 advantageously are permanent magnet direct current motors, which are characterized in that the motors create a torque which is proportional to the level of current flow.

Figure 1:
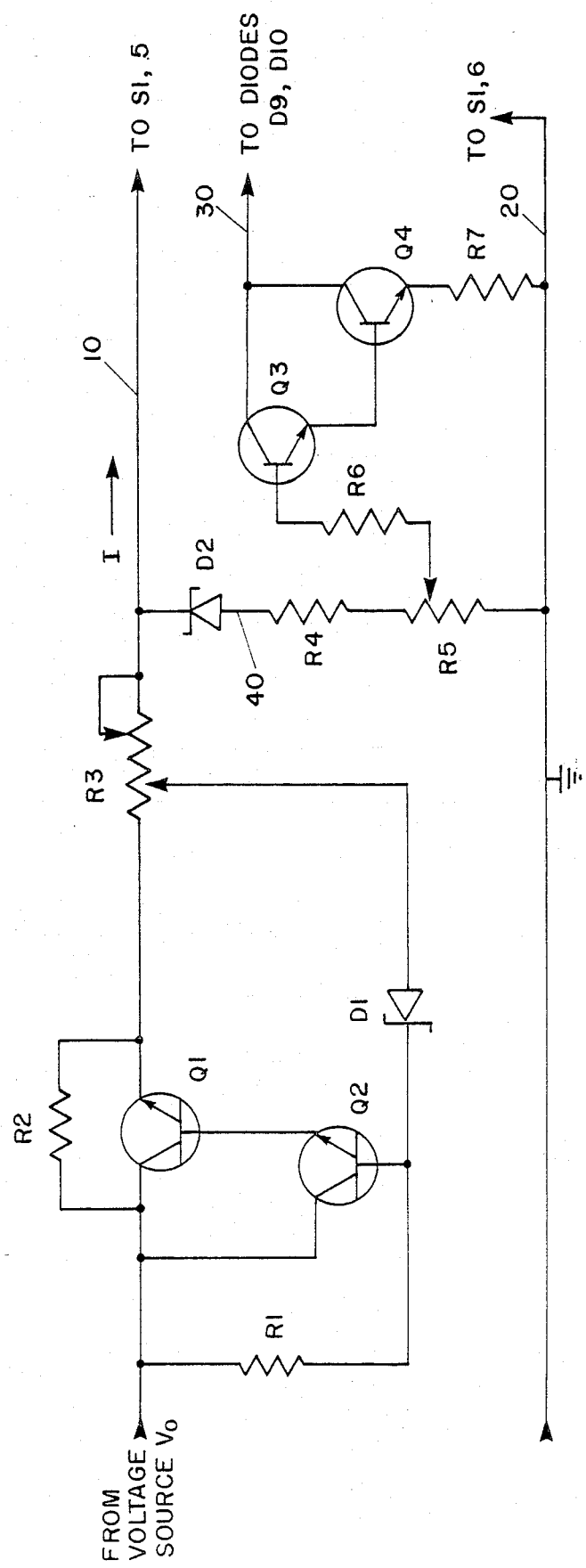
FIG. 1 is a partial schematic drawing of a circiut in accordance with a preferred embodiment of the invention.

With reference to the schematic diagram of FIG. 1, $V_o$ is a DC voltage source. Transistors Q1 and Q2, in series with adjustable resistor R3, act as a current source. Zener diode $D_1$ connects the base of transistor Q2 to an adjustable contact of resistor R3 to limit the value of current I through branch 10.

Figure 2:
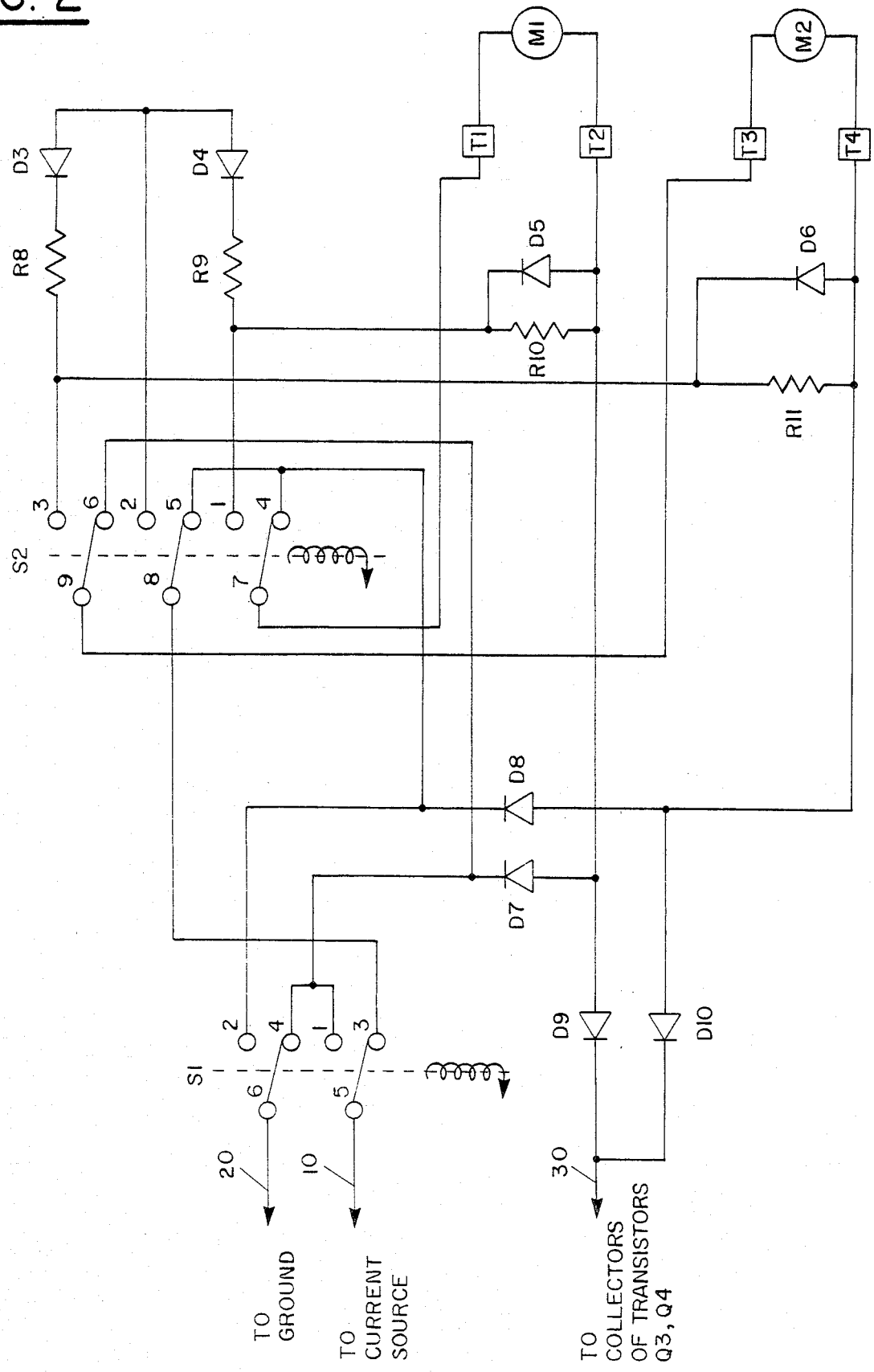
FIG. 2 is a partial schematic drawing of the remainder of the circuit of the embodiment of FIG. 1, shown in FORWARD/RUN mode.

With reference to FIG. 2, the circuit includes two networks of relays S1 and S2, the positions of which are controlled by the user through means not shown. Relay S1 determines whether the circuit is in Forward Mode (contacts at 3 and 4) or Reverse Mode (contacts at 1 and 2). In Forward Mode, motor M1 drives the takeup spool, while motor M2 is driven by the tape and provides a drag on the supply spool; in Reverse Mode the converse is true and the tape is transported in the opposite direction. In both modes, the motor connected to the supply spool acts as a generator.

Relay S2 determines whether the circuit is in Stop/Reset Mode (contacts at 1, 2, and 3) or Run Mode (contacts at 4, 5, and 6). In Stop/Reset Mode, discussed in detail below, motors M1 and M2 are slowed to a halt in response to a user-actuated signal or to a power loss. In Run Mode, the motors are driven either in forward or reverse.

As shown in FIG. 2, S1 is set to Forward and S2 is set to Run, and current I passes via contacts S1,5--S1,3 to S2,8--S2,5. An open circuit exists at S1,2 and reverse biased diode D8, so that current I is totally directed to terminal T1 of motor M1 via S2,4--S2,7.

The current path continues from terminal T2 of motor M1 to diodes D7 and D9 of which the latter is reverse biased. The current proceeds to ground via S1,4--S1,6 and branch 20. Terminal T3 of motor M2 is connected to ground via S2,6--S2,9. Thus, motor terminals T2 and T3 are effectively grounded. The current path proceeds via diode D10 and branch 30 to the collectors of Darlington transistors Q3 and Q4. With reference to FIG. 1, branch 40, including Zener diode D2, resistor R4, and potentiometer R5, connects the current source to ground and to the base of the Darlington transistors, completing a loop.

The voltage across the takeup motor (in this case M1) includes two components—the steady state IR component, and the counter EMF which is proportional to the motor's angular speed. At a reasonable approximation, the former component will develop across Zener diode D2 while the latter component will develop across R4 and R5. The voltage across R4 and R5 will induce a forward bias of transistors Q3 and Q4 with the consequent effect of controlling the current through motor M2.

Figure 4A:
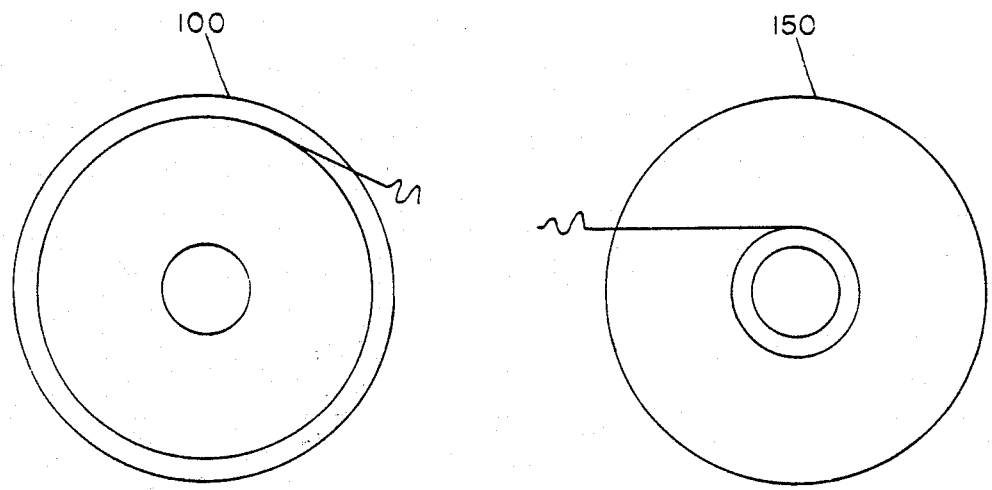
FIGS. 4A, 4B are plan views of the supply and takeup spools of a web transport system.
Figure 4B:
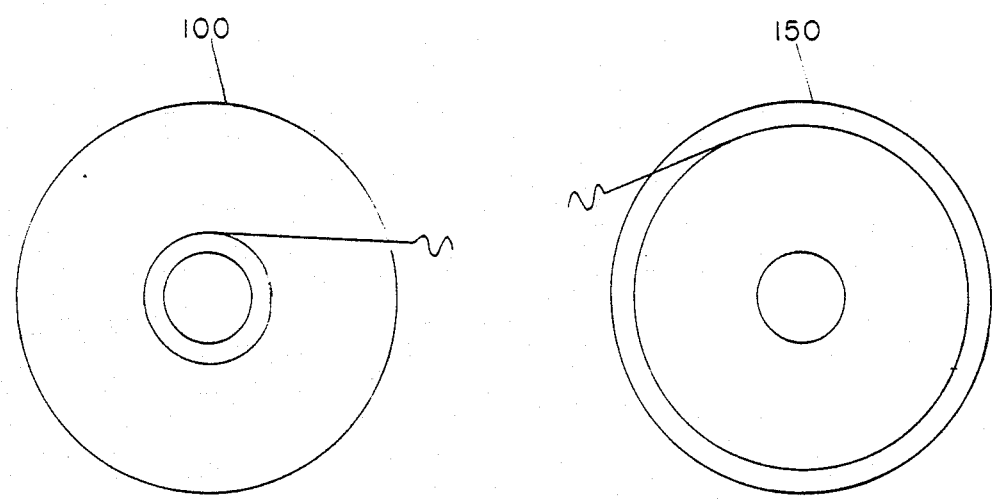

The operation of the circuit in the driving of the takeup and supply spools is illustrated in the partial plan view of FIGS. 4A and 4B. In FIG. 4A, the supply spool 100 is almost full and the takeup spool 150 almost empty, so that the latter rotates with an appreciably larger angular velocity. As a result, the driving motor (in Forward Mode, M1) provides a substantial counter EMF, thus increasing the current through motor M2. This in turn creates a higher dragging torque, which is desirable in order to maintain an even tension as explained above. In FIG. 4B, the supply spool 100 is almost empty and the takeup spool 150 almost full. In this state, the driving motor will produce considerably lower counter EMF which will result in a lower drag current, and therefore a lower dragging torque, as is desirable. During the transition between these states, the counter EMF will decrease as will the drag current.

The values of R3, R4, R5, R6, and R7 and of Q3 and Q4, may be chosen in order to provide a desired tension profile. Illustrative values for these components are:

R3 ... 150Ω, set for 140-145Ω end to end
R4 ... 8.2 K ½W
R5 ... 5 K
R6 ... 10 K ½W
R7 ... 100Ω 5W
Q3, Q4 ... D44R2

These circuit values provide a tension profile within a small percentage of being flat.

The operation of the circuit in the Reverse Mode (with relay S1 set to Reverse) is practically identical to that described above. The only difference is that the motor M2 receives current I, and drives the takeup spool, while motor M1 supplies drag on the supply spool. Diodes D8 and D9 become forward biased, while diodes D7 and D10 become reverse biased.

Reset and Off Modes

The circuit operation in these modes is designed to slow and stop the operation of motors M1 and M2. This is done by selectively braking the motor of the supply spool, and avoiding the occurence of tape slack. In the Reset mode, the user activates a control on the tape machine to halt the rotation of the spools; the power remains on. In the Off mode, the machine power is lost inadvertently, as by the pulling of the plug or a main power failure. These modes are similar in circuit operation with some differences hereinafter described.

Figure 3:
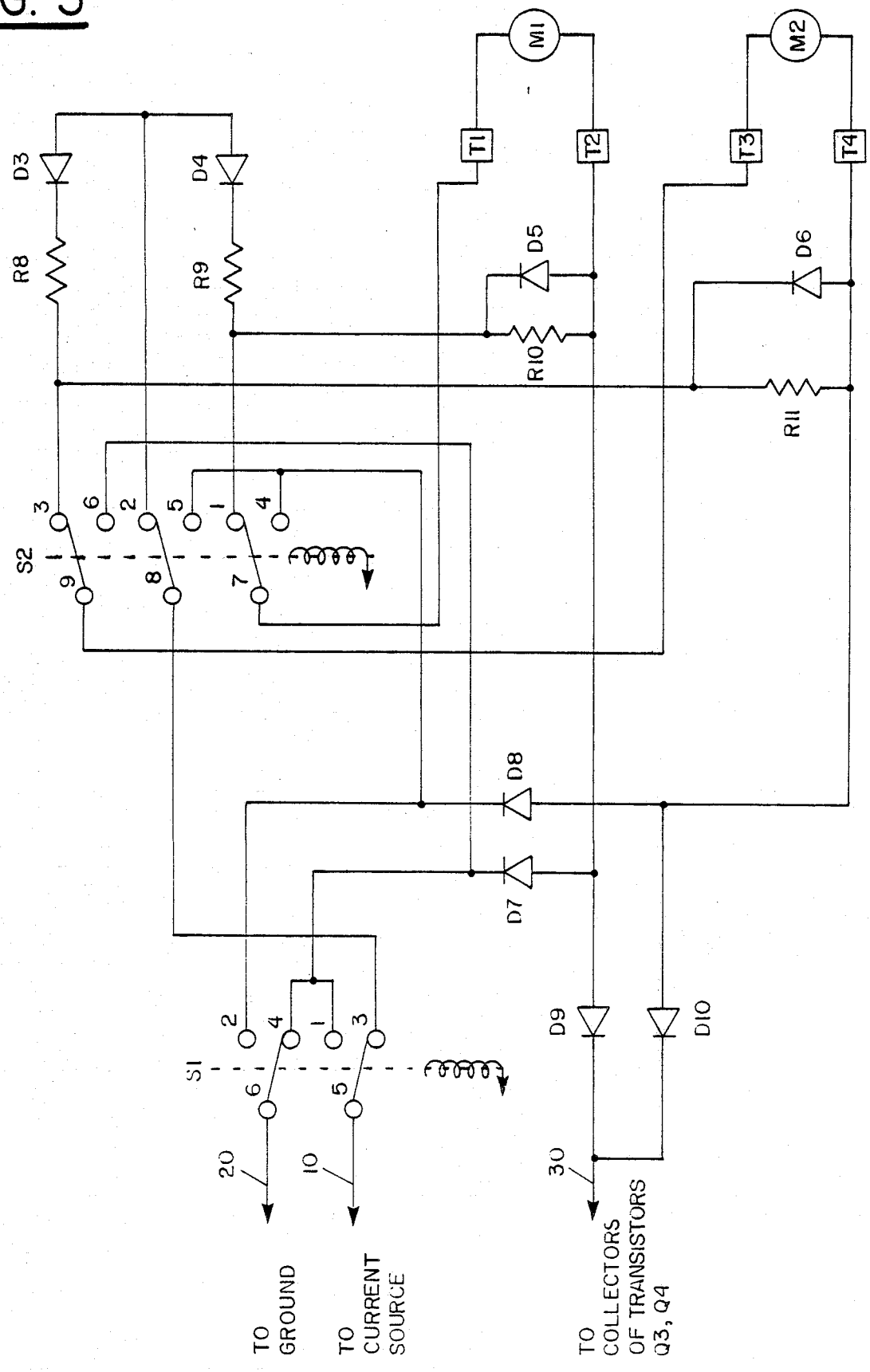
FIG. 3 is a partial schematic drawing of the circuit of FIG. 2, shown in FORWARD/STOP mode.

In the Reset mode, the DC current supply is on, and current is passed via relays S1 to relays S2. With reference to FIG. 3, S1 is set to Forward regardless of the setting of the relay during Run mode, allowing current to pass via contacts S1,3--S1,5 to S2,8. Relay S2 is set to Stop, so that the current path is by S2,2 to diodes D3 and D4. Diodes D3 and D4 allow the current to pass through voltage limiting resistors R8 and R9, and thence via S2,1--S2,7 and S2,3--S2,9 to terminal T1 of motor M1 and terminal T3 of motor M2. This has the effect of supplying a limited current to the motors, which will result in just enough torque to create a small tension on the tape. The torque will be sufficient to create a weak tendency of the spools to turn.

In either the forward or reverse driven state, the spools of motors M1 and M2 are coupled by the magnetic tape. Thus, the direction of rotation of the spools and direction of current flow through the motors will be correlated so that terminals T1 and T4 will be positive with respect to terminals T2 and T3 in Forward Drive, and relatively negative in Reverse Drive. Two networks of diodes and resistors in parallel connect the terminals T2 and T4 of motors M1 and M2 to the terminals T1 and T3, respectively. A counter EMF from the two motors will be passed by resistors R10 and R11 to provide a limited braking effect on both motors. Only in the case of the supply motor (e.g. M2 in forward drive) will the counter EMF be passed by the corresponding diode (in this case D6). Thus, there will be automatic electronic braking of the supply motor, with only a limited braking of the takeup motor. This may be verified by noting that only in the case of the supply motor is the corresponding diode (D5 or D6) forward biased. Diodes D3 and D4 prevent electrical interference of the two motors, ensuring independent braking.

When the circuit is in Off mode, no DC supply current is supplied via relays S1 and S2, and the only current through the two motors is that attributable to the counter EMF through the two parallel diodes—resistor networks. Relay S2 will automatically be switched to the Stop setting, as shown in FIG. 3, completing the closed loops. If power is lost when the motors are turning at low speed, the counter EMF may not suffice to retain tension on the tape, and some slack would result.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

We claim:

1. Improved apparatus for controlling the transport of a web between two spools, of the type including a driving spool, rotated by a driving motor, and a driven spool, to which a drag is applied by a driven motor, and means for energizing the motors, wherein the web is transported from the driven spool to the driving spool, in which the improvement comprises improved apparatus for controlling the angular speed of the spool rotations comprising:
   means for detecting a back electromotive force ("back EMF signal") produced by the driving motor during rotation of the driving spool;
   further detecting means for detecting a back EMF signal produced by the driven motor during rotation of the driven spool;
   a feedback signal path containing a resistor and diode in parallel for routing the back EMF signal produced by the driving motor back to that motor, wherein the diode blocks the back EMF signal produced by the driving motor; and
   a further feedback signal path containing a resistor and diode in parallel for routing the back EMF signal produced by the driven motor back to that motor, wherein the diode passes the back EMF signal produced by the driven motor.

2. Improved apparatus for transporting a web between two spools, of the type including a driving spool, rotated by a driving motor, and a driven spool, to which a drag is applied by a driven motor, wherein the web is transported from the driven spool to the driving spool and induces a rotation of the driven spool, in which the improvement comprises apparatus for regulating the tension of the web during transport comprising:
   means for energizing said driving motor;
   means for detecting transient signals produced by said driving motor during its rotation of said driving spool; and
   means responsive to the detected transient signals for regulating an excitation of said driven motor to maintain a prescribed tension in said web,
   wherein a signal path is included between said motors having an intermediate ground connection, thereby establishing a reference level for the regulating means.

3. Improved apparatus for transporting a web between two spools, of the type including a driving spool, rotated by a driving motor, and a driven spool, to which a drag is applied by a driven motor, wherein the web is transported from the driven spool to the driving spool and induces a rotation of the driven spool, in which the improvement comprises apparatus for regulating the tension of the web during transport comprising:
   means for energizing said driving motor;
   means for detecting transient signals produced by said driving motor during its rotation of said driving spool, including a Zener diode to approximate said transient signals; and
   means responsive to the detected transient signals for regulating an excitation of said driven motor to maintain a prescribed tension in said web.

4. Improved apparatus for transporting a web between two spools, of the type including a driving spool, rotated by a driving motor, and a driven spool, to which a drag is applied by a driven motor, wherein the web is transported from the driven spool to the driving spool and induces a rotation of the driven spool, in which the improvement comprises apparatus for regulating the tension of the web during transport comprising:
   means for energizing said driving motor;
   means for detecting transient signals produced by said driving motor during its rotation of said driving spool;
   means responsive to the detected transient signals for regulating an excitation of said driven motor to maintain a prescribed tension in said web; and
   means for controlling the angular speed of spool rotation, comprising:
      alternative detecting means for detecting a back electromotive force ("back EMF signal") produced by the driving motor during rotation of the driving spool;
      further detecting means for detecting a back EMF signal produced by the driven motor during rotation to the driven spool;
      a feedback signal path for routing the back EMF signal produced by the driven motor during rotation to the driven spool;
      a feedback signal path for routing the back EMF signal produced by the driving motor back to that motor, in a manner tending to reduce its speed of rotation; and
      a further feedback signal path for routing the back EMF signal produced by the driven motor back to that motor, in a manner tending to reduce its speed.

5. Apparatus as defined in claim 2 wherein the regulating means comprises a transistor, said transient signals being applied to the base of said transistor, and wherein the signal path extends from said driven motor to the collector of said transistor.

6. Apparatus as defined in claim 4, further comprising means for preventing the interference of the respective back EMF signals, so that each back EMF signal is routed essentially only to the motor producing it.

7. Apparatus as defined in claim 4 wherein said motors are of the direct current type.

8. Apparatus as defined in claim 4, further comprising means for reducing the magnitude of the back EMF routed through the feedback signal path of the driving motor, so that the angular speed of the driven spool is reduced to a greater extent than is the angular speed of the driving spool.

9. Apparatus as defined in claim 8 wherein the feedback signal paths each contain a resistor and diode in parallel, and wherein the diode in the driving feedback signal path blocks the back EMF signal produced by the driving motor, but the diode in the driven feedback signal path passes the back EMF signal produced by the driven motor.

10. Apparatus as defined in claim 4, further comprising means for limiting the effect of the energizing means on said motors; thereby generally reducing the angular speed of rotation of said spools.

* * * * *